United States Patent [19]

AbuJudom, II et al.

[11] Patent Number: 4,979,672
[45] Date of Patent: Dec. 25, 1990

[54] SHAPE MEMORY ACTUATOR

[75] Inventors: David N. AbuJudom, II, Brookfield; Paul E. Thoma, Wauwatosa; Roger V. Hajny, Cedarburg; Steven A. Linstead, North Prairie, all of Wis.

[73] Assignee: Johnson Service Company, Milwaukee, Wis.

[21] Appl. No.: 510,449

[22] Filed: Apr. 18, 1990

Related U.S. Application Data

[63] Continuation of Ser. No. 369,453, Jun. 21, 1989, abandoned.

[51] Int. Cl.$^5$ ............................................. G05D 23/19
[52] U.S. Cl. ................... 236/68 B; 236/1 G; 236/101 B; 236/101 D; 251/11
[58] Field of Search ................. 236/1 G, 68 B, 68 R, 236/101 B, 101 D; 251/11

[56] References Cited

U.S. PATENT DOCUMENTS

| | | | |
|---|---|---|---|
| 2,262,341 | 11/1941 | Shaw | 236/68 B |
| 3,613,732 | 10/1971 | Willson et al. | 251/11 X |
| 4,284,235 | 8/1981 | Diermayer et al. | 236/68 R X |
| 4,523,605 | 6/1985 | Ohkata | 236/101 B X |

FOREIGN PATENT DOCUMENTS 49616 3/1984 Japan .............................. 236/101 D Primary Examiner—William E. Tapolcai
Attorney, Agent, or Firm—Foley & Lardner

[57] ABSTRACT

A shape memory actuator for controlling the position of a control member, such as a damper plate in a duct, the actuator including first and second shape memory elements each having an austenite phase transition temperature above which each element assumes a predetermined memory shape and a lower phase which forms when said element is stretched from the predetermined memory shape, the first and second elements being connected to move the control member in different directions when one or the other of the elements are heated to a temperature above its austenite phase transition temperature and an electrical circuit for selectively raising the temperature of one or the other of the elements. The control member may be held in a position between full open and full closed by holding mechanisms which connect the actuator to the control member. The holding mechanisms include a visco elastic mechanism, a positive interlock mechanism that is released by a shape memory element, or a magnetic member formed of alternately arranged magnetic poles. A number of connectors are disclosed for connecting the SMA members to the dampers.

15 Claims, 5 Drawing Sheets

SHAPE MEMORY ACTUATOR

This is a continuation of U.S. Ser. No. 07/369,453 filed on June 21, 1989, now abandoned.

BACKGROUND OF THE INVENTION

1. Field of the Invention

The present invention relates to a bidirectional shape memory actuator having specific physical and mechanical properties and, more particularly, to the positioning of a moveable member, such as a vent control, using a shape memory actuator.

2. Description of the Prior Art

Shape memory elements have been used to open and close vent dampers as shown and described in U.S. Pat. No. 4,284,235 entitled "Vent Control Arrangement for Combustion Apparatus" issued on Aug. 18, 1981. In the arrangement disclosed in this patent, a helix made of a shape memory material is used to open a damper plate. The damper plate is normally in a closed position and opened by heating the helix to the deformation temperature so that it deforms to rotate the damper plate to a fully opened position. A lever mounted on the helix, on reaching the fully open position, closes a limit switch that activates a solenoid actuated gas valve to light the burner. The helix remains energized until the heat requirement is satisfied. The holding circuit is then opened. As the helix cools down, it will rotate the damper to the closed position.

In a device of the type shown in U.S. patent application Ser. No. 276,698 entitled "Personal Environmental Module" filed on Nov. 28, 1988, and assigned to the same assignee, dampers are used to control the air flow rate of cool air and room air into the module to meet the personal requirements of the individual working in the work station. In this type of device motor controllers were used to control the position of the damper plates and thus the temperature and air flow rate of the air passing through the dampers. Accurate control of the position of the damper plate is critical to the success of the module. The electric motors have a limited life, are noisy and expensive and also require periodic maintenance.

SUMMARY OF THE INVENTION

In the present invention, a shape memory actuator having two shape memory elements is used to control the position of a damper plate in both opening and closing the damper. Using two shape memory elements makes it possible to positively locate a damper plate in a duct at different positions and thereby control the air flow rate through the duct to satisfy conditions of temperature and pressure. The shape memory elements can be directly incrementally heated to move the damper plate in the duct to positions intermediate full open and full closed. It should be noted that while the following description is with respect to the control damper plate in an air flow duct, the invention is not so limited. The shape memory actuator can be used to position any fluid control member, whether liquid or gas, where the control member is moved in one direction to an open position and another direction to a closed position.

The two shape memory elements, each have a predetermined shape memory austenite or upper phase transition temperature and a predetermined martensite or lower phase transition temperature, one of the shape memory elements being connected to move the damper plate toward an open position when the temperature of the shape memory element is raised to the austenite or upper phase transition temperature and the other actuator being connected to move the damper plate toward the closed position when the temperature of the second shape memory element is raised to the austenite or upper phase transition temperature. The shape memory elements can be heated directly or indirectly to move the damper plate to meet the required air flow rate conditions.

One of the principal features of the invention is the ability to hold a damper plate in a position between full open and full closed without a holding current in the shape memory elements.

One of the features of the invention is the provision of a holding device which may be in the form of a visco elastic mechanism, brake mechanism or a magnetic stepping mechanism to hold the damper plate in a particular position in a duct.

Another feature of the invention is the use of Shape Memory Alloy Rotating Terminal (SMART) connectors for connecting the shape memory elements to the damper plate and to fixed or stationary mounting pins. These connectors have a low mass to avoid heat sinking at the ends of the shape memory elements, act as electric couplers and provide for rotary motion of the connector at the point of connection.

A principal advantage of the invention is the provision of a shape memory actuator that is simple in structure and operation in comparison to motor controlled systems as well as being noiseless in operation.

Another advantage of the invention is the elimination of drive motors, gears, and the like presently used as damper controllers.

Other principal features and advantages of the invention will become apparent to those skilled in the art upon review of the following detailed description, claims and drawings.

DETAILED DESCRIPTION OF THE DRAWINGS

Figure 1:
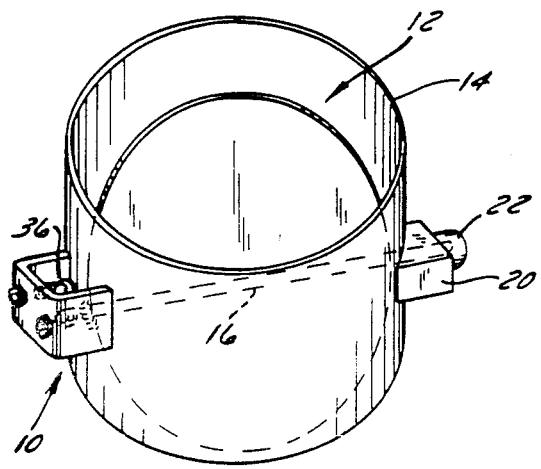
FIG. 1 is a perspective view of a fluidic damper using the shape memory actuator according to the invention to control the position of the damper plate in the duct.

Before the invention is explained in detail, it is to be understood that the invention is not limited in its application to the details as set forth in the following description or illustrated in the drawings. The invention is capable of other embodiments and of being practiced or carried out in various ways. Also, it is to be understood that the phraseology and terminology used herein is for the purpose of description and should not be regarded as limiting.

DESCRIPTION OF THE INVENTION

Figure 3:
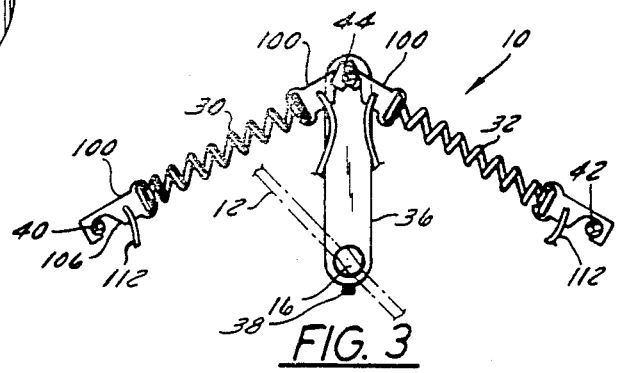
FIG. 3 is a view of the shape memory actuator showing the damper plate in the partially open position.
Figure 2:
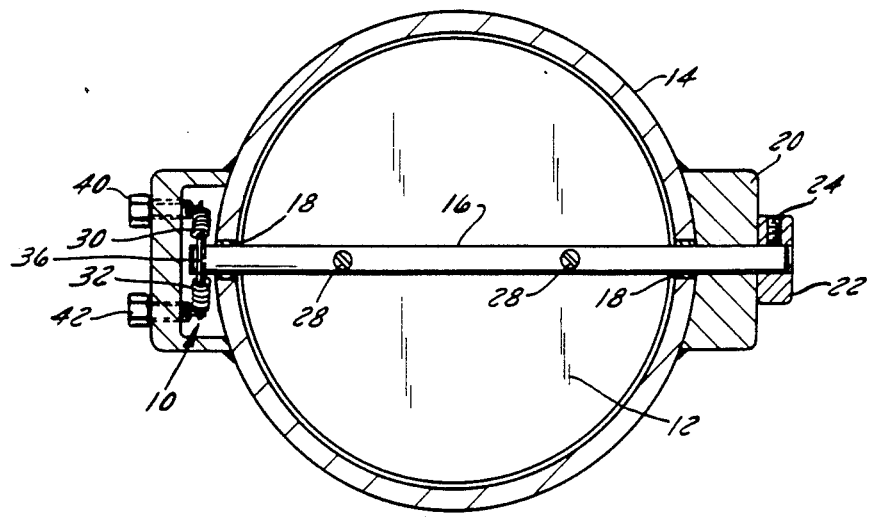
FIG. 2 is a top view of the fluidic damper of FIG. 1 showing the position of the shape memory actuator.

Referring to FIGS. 1, 2, and 3 of the drawings, a shape memory actuator 10 according to the invention is shown for controlling the position of a damper plate 12 in a duct 14. The damper plate 12 is secured to a rod 16 by means of a set screw 28. One end of the rod is mounted for rotary motion in a bearing 18 and the other end in a bearing block 20. One end of the rod 16 is connected to the shape memory actuator 10. The other end of the rod extends outwardly from the bearing block 20 and is secured in the block 20 by a retaining ring 22 and a set screw 24.

In accordance with the invention, the shape memory actuator 10 includes a first means in the form of a shape memory element 30 for opening the damper plate 12 and a second means in the form of a shape memory element 32 for closing the damper plate 12. The shape memory elements 30 and 32, as shown in FIGS. 1, 2, and 3, are in the form of coil springs, however, it should be noted that the shape memory elements can be provided in various forms or configurations. The element 30 is connected at one end to a pivot pin 44 mounted on the end of a lever 36 which is secured to the rod by a screw 38. The other end of the shape memory element 30 is connected to a fixed pivot pin 40. The element 32 is connected to pivot pin 44 and to a fixed pivot pin 42.

The shape memory elements 30 and 32 are made of the same shape memory alloy so that they have essentially the same hysteresis and phase characteristics. Shape memory alloys, as described herein, are of the type described in U.S. application Ser. No. 183,818 filed on Apr. 20, 1988, entitled "A Method For Producing A Shape Memory Alloy Member Having Specific Physical and Mechanical Properties" which is assigned to the same assignee and is incorporated herein by reference. In that application, a method is described for providing specific physical and mechanical properties for shape memory alloy materials. These properties relate to the transformation temperatures of the various shape memory phases, the resulting hysteresis between such phases, and the relationship between the start and finish temperatures of the respective phases. Although the same alloy is described herein, it is within the contemplation of the invention to use different shape memory alloys as well as alloys having different characteristics for each of the shape memory elements.

Figure 4A:
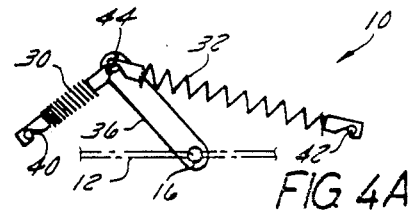
FIG. 4A is a view similar to FIG. 3 showing the damper in the closed position.

Referring to FIG. 4A, it should be noted that the shape memory element 30 has been heated to a temperature at or above the austenite phase transition temperature, and the element has assumed the tight coil spring memory shape. As the element 30 assumes the tight coil spring shape the damper 12 is closed and the element 32 is stretched mechanically transforming element 32 from a austenite phase A to a martensite phase, M. When the shape memory element 30 cools after being transformed to the austenite or upper phase A, the element 30 will remain in the austenite phase until the element 32 is heated to open the damper. As the element 32 is heated above its austenite phase transition temperature, it assumes the tight coil memory shape, FIG. 4B. The cooled element 30 will be stretched to mechanically transform the element 30 from the austenite phase to the martensite phase.

Certain thermo mechanically processed shape-memory alloys transform from the austenite phase to the martensite phase by first transforming to a rhombohedral phase and then transforming to the martensite phase.

It is important in the transformation of the elements 30 and 32 from the austenite to the martensite phase, that the transformation is mechanically induced by stretching and not thermally induced by cooling. The life of the SMA spring is reduced if the element is initially thermally induced to the martensite phase and then reoriented when mechanically stretched by the other element. This is prevented by selecting an SMA alloy that is compatible with the expected environmental conditions.

It should be noted that in the operation of the damper control two elements, 30 and 32, are used. When one element is heated to open or close the damper, the second element will be stretched by the contracting motion of the first element. In either case, once the damper is opened or closed, the heated element is allowed to cool down no farther than the start of the unstressed martensite phase.

It is also possible to partially open or close the damper. In this regard, one of the elements 30 or 32 can be incrementally heated up to obtain partial austenite transformation. The second of the elements will be stretched, to partially induce martensite transformation. If it is desired to open the damper farther, the same element can be heated again to obtain the desired increase in the opening. If it is desired to move the damper in the opposite direction, the second element can be heated to obtain partial or complete austenite transformation to move the damper in the opposite direction. It should be noted that both of the elements may not be simultaneously heated to the austenite phase. In partial transformation, both phases may coexist in the same element.

Figure 5:
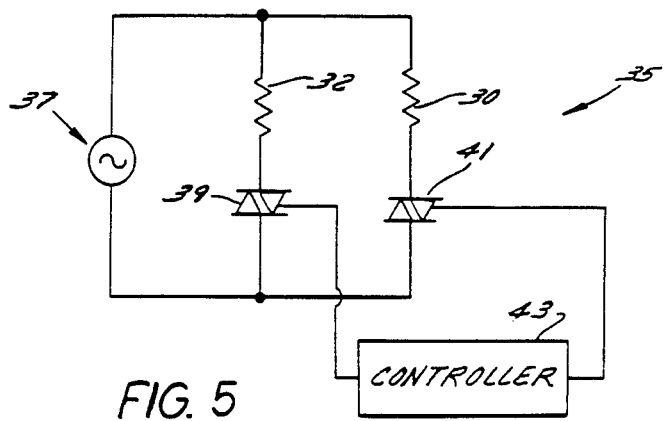
FIG. 5 is a schematic diagram of an electrical circuit for the shape memory actuator.

The shape memory elements 30 and 32 are energized by means of an electrical controller circuit 35 as shown in FIG. 5. The shape memory elements 30 and 32 are connected across a power source 37 and in series with solid state switches (triacs) 39 and 41. Each switch 39, 41 being controlled by controller 43. When the controller responds to a signal to increase or decrease the air flow through the duct 14, one of the switches 39 or 41 is activated to close the circuit for one of the shape memory elements 30, 32. The energized shape memory element will move to its memory shape moving the damper plate in the opening or closing direction. When the damper plate reaches the desired position, the controller will turn off the switch. Once the switch is turned off, a time delay is initiated by the controller preventing the energization of the other switch until the previously energized element has cooled down to a temperature that permits the mechanical induction of the martensite phase.

Figure 4B:
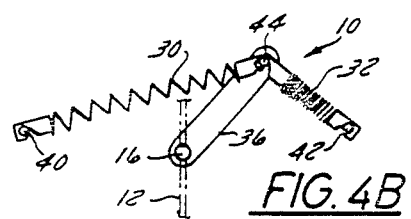
FIG. 4B is a view similar to FIG. 3 showing the damper in the full open position.

In operation, the first shape memory element 30 is energized to close the damper plate 12. As seen in FIG. 4A, the first element 30 will contract and the second shape memory element 32 will be stretched by the contraction of the first element 30. The damper is opened by heating element 32. As seen in FIG. 4B, the element 32 contracts and the element 30 is stretched by the contracting motion of element 32.

If the damper is to be partially opened as shown in FIG. 3, the element 30 is heated long enough to move the damper plate 12 incrementally to the desired setting and then de-energized.

A balance of forces is achieved between the stress imposed on the heated element as it contracts and is transformed to the austenite phase while the other element is stretched mechanically inducing the martensite phase in the other element.

When the element 30 is de-energized, the element 30 may have sufficient spring force to move the damper plate 12 slightly in the opposite direction. Means are therefore provided for holding the damper plate 12 in the position to which it was moved by the energized element.

Figure 6:
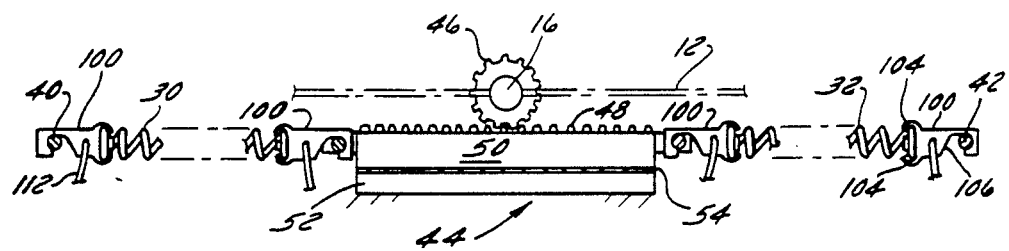
FIG. 6 is a view of the shape memory actuator showing the shape memory elements connected to a visco elastic drag assembly for positively positioning the damper plate in a duct.

In this regard and referring to FIGS. 6 through 10, a number of shape memory actuators are shown which include means for holding the damper plate 12 in a fixed position with respect to the duct 14. As seen in FIG. 6, the shape memory elements 30, 32 are connected to a drag assembly 44 which is used to hold the damper plate 12 in a particular position. The drag assembly 44 includes a pinion gear 46 mounted on the rod 16 and a rack 48 provided on an elongate member 50 which is connected at each end to the elements 30, 32. A fixed member 52 is located in abutting relation to the member 50. A viscoelastic material 54 is provided between the elongate members 50, 52 to slightly resist sliding motion between the members 50, 52.

In operation, one of the elements 30, 32, is energized so that it starts to heat up. As it passes through the austenite start transition temperature, the element will start to move toward its memory shape configuration pulling the elongate member 50 toward the energized element. The de-energized element will stretch and the damper plate 12 will move toward the open or closed position. When the damper plate 12 reaches the desired position, the energized element is de-energized. The stretched element will try to pull the member 50 slightly backward. The visco elastic material will hold the elongate member 50 in a fixed relation with respect to the fixed member 52 so that the damper plate 12 remains in the fixed or desired position.

Figure 7:
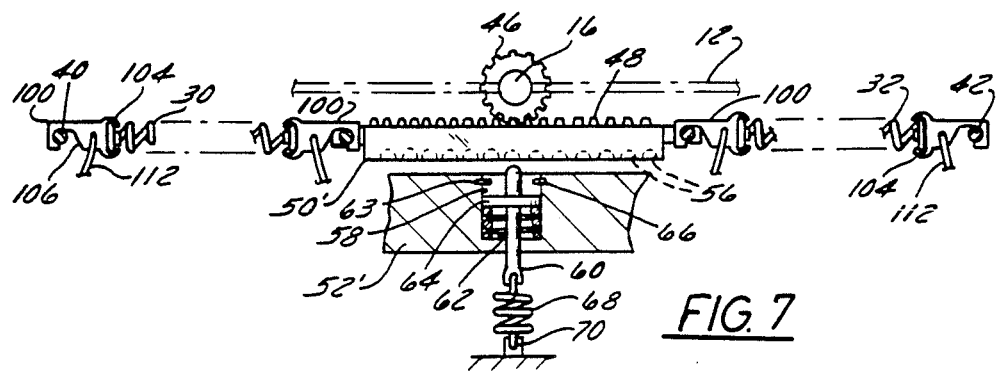
FIG. 7 is a view of the shape memory elements connected to a damper plate through a shape memory controlled brake mechanism for maintaining the position of the damper plate in a duct.

Referring to FIG. 7, another form of holding means is shown which includes an elongate member 50' having a rack 48 on one surface of the member 50' which is positioned to engage the pinion gear 46. A series of depressions 56 are provided on the opposite surface of the member 50' A fixed member 52' is positioned next to member 50' and is provided with a bore 58 that houses a stop pin 60. The pin 60 is biased into a engagement with the elongate member 50' by means of a spring 62 which bears against a plate 64 provided on the pin 60. The pin is retained within the bore by means of a retaining ring 66 provided in a groove 63 in the open end of the bore 58. The pin 60 is withdrawn from the elongate member 50' by means of a shape memory element 68 which is connected to the end of the pin 60 and to a fixed pin 70.

Whenever the damper plate 12 is to be moved to a new position, one of the elements 30, 32 will be energized and the element 68 will also be energized. When the damper plate 12 reaches the desired position, both the energized element and the element 68 will be de-energized so that the spring 62 will bias the pin 60 into engagement with the corresponding depression 56 to lock the member 50' in a fixed position.

Figure 8:
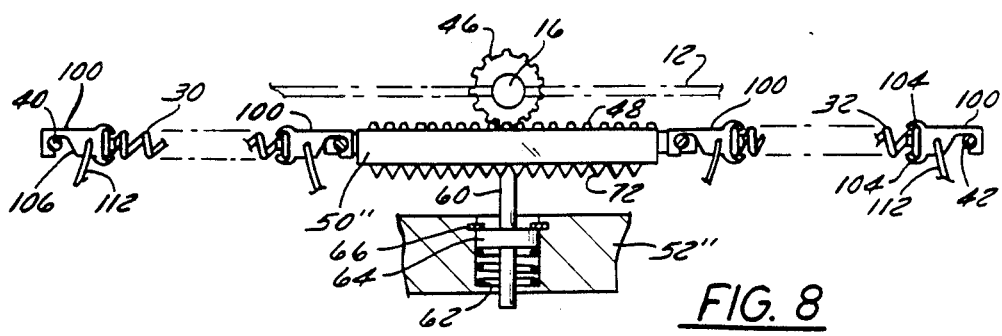
FIG. 8 is a view similar to FIG. 7 showing the shape memory elements connected to a damper plate through a spring controlled brake mechanism for controlling the position of the damper plate in a duct.

In the embodiment of the invention shown in FIG. 8, the elongate member 50" includes a rack 48 which is positioned to engage the pinion gear 46. A ratchet gear 72 is provided on the bottom of the member 50". The stationery member 52" includes a pin 60, spring 62 and plate 64 as described above. The pin 60 is in the form of a pawl which is biased by means of a spring 62 into engagement with the gear 72. When the element 30 is energized, the elongate member 50" will be moved to the left and the pawl 60 will snap from one gear to the next in the gear 72 and thereby retain the member 50" in position when the element 30 is de-energized.

Figure 9:
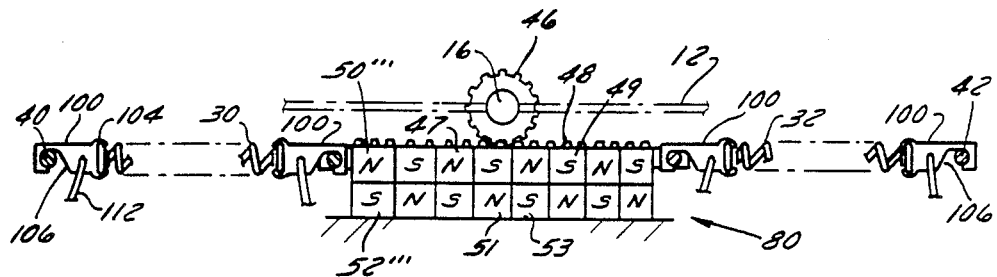
FIG. 9 is a view of the shape memory elements connected to a damper plate through a magnetic stepping mechanism for positively locating the position of the damper plate in the duct.
Figure 10:
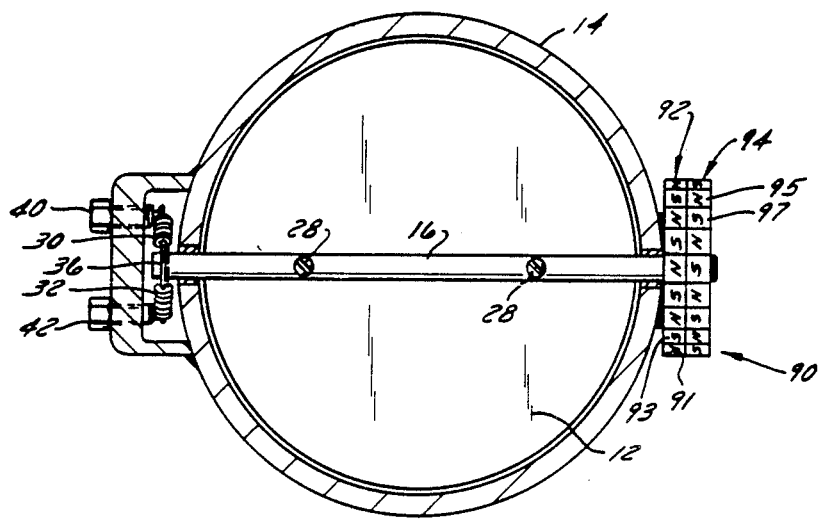
FIG. 10 is a view of the top of an air flow duct using a rotary magnetic stepping mechanism for controlling the position of the damper plate.

In FIGS. 9 and 10 step by step holding means are shown in the form of an elongate magnetic assembly 80 (FIG. 9) and a circular magnetic assembly 90 (FIG. 10). As seen in FIG. 9, the elongate member 50''' has a rack 48 positioned to engage the pinion gear 46. The member 50''' is made up of alternate north and south magnetic pole pieces 47 and 49, respectively. A fixed member 52''' is also made up of alternate north and south pole pieces 51 and 53, respectively. When one of the shape memory actuators is heated, the elongate member 50''' will be moved to the right or left with respect to the fixed member 52'''. When the shape memory element is de-energized, the member 50''' will move to align the north pole 47 and south pole 49 with the corresponding south pole 53 and north pole 51 on member 52'''.

In FIG. 10 a duct 14 is shown of the type shown in FIG. 1 and 2 in which the step by step holding means is in the form of circular magnetic members 92 and 94 which are used to control the position of the damper plate 12. The member 92 having alternate north and south poles 91, 93, respectively. The member 94 having alternate north and south poles 95, 97, respectively. The member 92 is mounted on the duct 14 and the member 94 is mounted on the end of the rod 16. On energization of one of the elements 30 or 32, the member 94 will rotate to a position wherein the north and south poles of member 94 are opposite the south and north poles of member 92 when the actuator is de-energized.

Figure 11A:
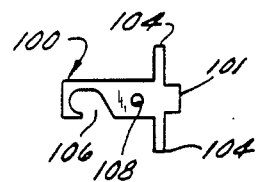
FIG. 11a is a side plan view of the connector
Figure 11:
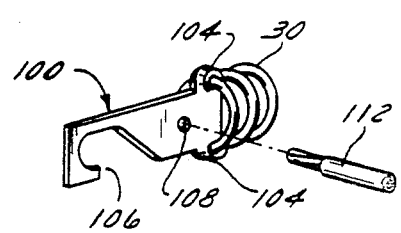
FIG. 11 is a perspective view of a Shape Memory Alloy Rotating Terminal (SMART) connector shown mounted on the first turn of a shape memory coil.
Figure 12:
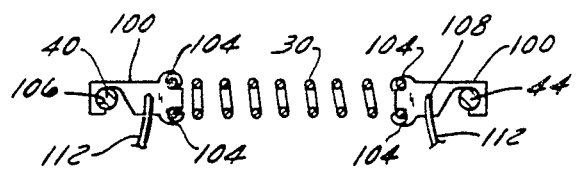
FIG. 12 is a view of the SMART connector shown in FIG. 11a mounted on each end of a coil spring type shape memory element.
Figure 13:
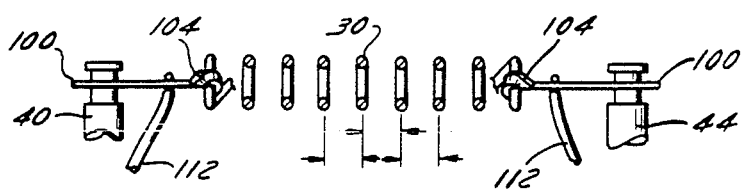
FIG. 13 is a view of the shape memory element of FIG. 12 rotated 90° to show the connection to the pin of the damper plate lever and stationary pin.

The elements 30 and 32 can be connected to the fixed pins and moveable members by means of shape memory alloy rotational terminal (SMART) connectors 100. The shape memory elements 30 and 32 are shown in the form of coils in FIGS. 11, 12, and 13. This form is used because it provides the least amount of stress in the actuator. It is important to provide a connector that requires a minimum amount of the turns of the coil for mechanical and electrical connection and is of small mass and low thermal conductivity to prevent heat sinking at the ends of the coil. It is important to minimize heat sinking in the connectors so that there is equal strain between each loop when heated and cooled as shown in FIG. 13.

This is accomplished by using SMART connectors 100 which are stamped from sheet stock in the form of a flat strip of material having a low mass. The connector 100 is provided with a pair of legs 104 at one end and a hook 106 at the other end. A hole 108 is provided in the center of the strip for connecting the connector to an electrical lead 112. The SMART connectors are connected to the last turn of the coil at each end of the shape memory elements 30 and 32. The connectors are mounted on the coil by inserting the projection 101 at the end of the connector into the coil and wrapping the legs 104 around the coil thus providing both a mechanical and electrical connection to the element. The hole 108 provides a connection for the electric leads 112.

Figure 14:
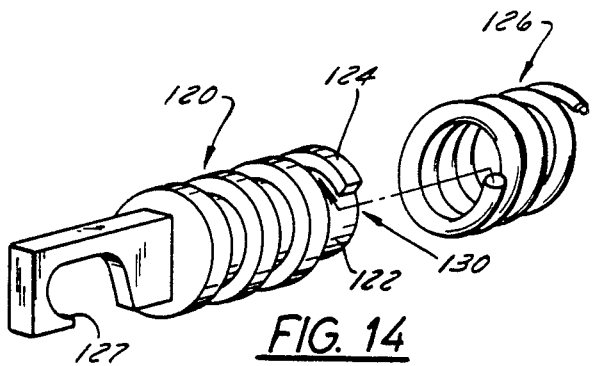
FIG. 14 is a perspective view of a non-conductive connector for a coil spring type shape memory element.
Figure 15:
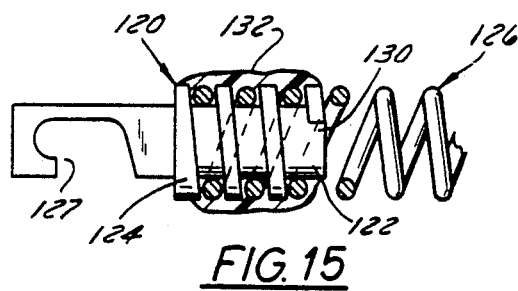
FIG. 15 is a view, similar to FIG. 14, showing a non-conductive connector having a portion of the thread broken away to provide for connection of the coil type element to the connector.
Figure 16:
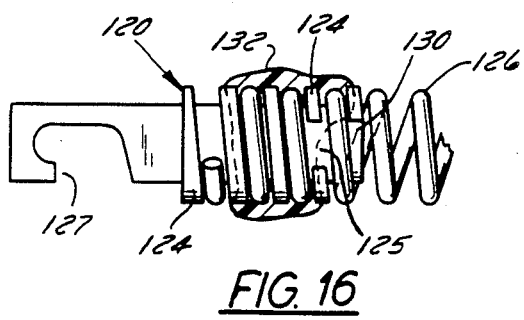
FIG. 16 is a view showing another form of mounting for the coil type element to the non-conductive terminator.

In FIGS. 14, 15 and 16 a spring shape memory alloy link (SSMAL) connector 120 is shown as an alternate means for connection to the element. The link connector is made out of a material which is electrically and thermally non-conductive so that there is no heat sink formed at the end of the coil. The link connector 120 is in the form of a rod 122 which is threaded either totally or partially with a square thread 124 that is matched to the SMA member turns per inch. The diameter of the rod 122 is measured from the bottom of the thread and is the same or slightly larger than the inside diameter of the coils of the shape memory element 126.

The materials which can be used for this type of link are engineering thermoplastics. Means can be formed on the end of the rod 122 for attaching the connector 120 to a pivot member. Such means is in the form of a hook 127, secured to or molded on the end of rod 122.

Means are provided at the end of the thread 124 for forming a solid, inflexible point of egress 130 for the element 126. Such means is formed at the end of the rod 122 by removing a portion of the thread at the spring end of the rod 122. The portion is removed for one-fourth of one revolution from the normal end of the thread. This provides a solid, inflexible point of egress 130 for the element 126 when wound on the link connector.

Means can be provided on the threads of the link connector for covering the turns of the coil in the spaces between the threads on the connector so that they cannot unwind. Such means is in the form of a non-flowing, high peel strength epoxy 132 applied in the spaces between the threads where the coils of the element have been wound as shown in FIG. 15.

Referring to FIG. 16, a modified form of link connector 120 is shown in which a portion of the thread 124 is removed to form a space 125 to facilitate the application of the epoxy 132 so that the epoxy does not contact the active portion of the coils of the element 126. The active portion of the element 126 begins at the point of egress 130.

Thus, it should be apparent that there has been provided, in accordance with the invention, a shape memory actuator for controlling the position of a fluid control member in a duct that fully satisfies the aims and advantages set forth above. While the invention has been described in conjunction with specific embodiments thereof, it is evident that there are many alternatives, modifications, and variations that will be apparent to those skilled in the art. Accordingly, it is intended to embrace all such alternatives, modifications, and variations as fall within the spirit and broad scope of the appended claims.

We claim:

1. A shape memory actuator for controlling the position of a damper plate in a duct, said actuator comprising:

a first shape memory element having an austenite phase transition temperature above which said first element assumes a predetermined memory shape and a stress induced martensite phase which forms when said element is stretched from said predetermined memory shape, said first element being operatively connected to move the damper plate toward a fully opened position when the temperature of said first element is raised to or above its austenite phase transition temperature;

first means for selectively raising the temperature of said first element;

a second shape memory element having an austenite phase transition temperature above which said second element assumes a predetermined memory shape and a stress induced martensite phase which forms when said second element is stretched from said predetermined memory shape, said second element being operatively connected to move the damper plate toward a fully closed position when the temperature of said second element is raised to or above its austenite phase transition temperature;

and second means for selectively raising the temperature of said second element.

2. The actuator according to claim 1 including means for holding the damper plate in an intermediate position between fully open and fully closed when said first or second temperature raising means is stopped.

3. The actuator according to claim 2 wherein said holding means includes a viscoelastic material for imposing a drag on the damper plate whereby said damper plate will remain in a fixed position when said first or second element is cooled.

4. The actuator according to claim 2 wherein said holding means comprises a first elongate member operatively connected to the damper plate and to said shape memory elements, said first member having a series of recesses on one side, and a second fixed member disposed in a spaced relation to said first member, means mounted in said second member for movement into engagement with one of said recesses in said first member whereby said first elongate member cannot move and shape memory means having an upper phase transition temperature above which said shape memory means assumes a predetermined memory shape, said shape memory means disengaging said engaging means from said first member when the temperature of said shape memory means is above its upper phase transition temperature.

5. The actuating device according to claim 2 wherein said holding means comprises a first elongate member operatively connected to the damper plate and having ratchet teeth along one side, means positioned next to said first elongate member for engaging said teeth and means for biasing said engaging means into engagement with said teeth to prevent movement of said first member.

6. A shape memory actuator for positioning a control member, said actuator comprising a first shape memory means for moving the control member in one direction, a second shape memory means for moving the control member in the other direction, said first means including a shape memory element having predetermined upper and lower phase transition temperatures, said first element assuming a predetermined memory shape when heated to said upper phase transition temperature, said second means including a shape memory element having predetermined upper and lower phase transition temperatures, said second element assuming a predetermined memory shape when heated to said upper phase transition temperature; means for selectively raising the temperature of said first element or said second element to its upper phase transition temperature whereby the control member will be moved in said one or said other direction and means for holding the control member in a fixed position when the heated element is allowed to cool.

7. The actuator according to claim 6 wherein said holding means comprises a first elongate member operatively connected to the control member and to said first and second shape memory elements, a second fixed elongate member positioned in close proximity to said first elongate member and a visco elastic material positioned between said elongate members to impose a drag on the movement of said first elongate member with respect to the fixed elongate member when the temperature of said first or said second shape memory element cools, whereby the control member will be held in a fixed position.

8. A shape memory actuator for positioning a control member, said actuator comprising: a first shape member means for moving the control member in one direction; a second shape memory means for moving the control member in the other direction; said first means including a shape memory element having predetermined upper and lower phase transition temperatures, said first element assuming a predetermined memory shape when heated to said upper phase transition temperature, said second means including a shape memory element having predetermined upper and lower phase transition temperatures, said second element assuming a predetermined memory shape when heated to said upper phase transition temperature, means for selectively raising the temperature of said first element or said second element to its upper phase transition temperature whereby the control member will be moved in said one or said other direction, electrically conductive means connecting ne end of said first and second shape memory means to the control member and the other ends to fixed pivot pins, said conductive means comprising a thin flat strip having a pair of legs at one end and a curved hook at the other end, said legs being connected to said shape memory elements and said curved hook being connected to the control member and to said pivot pins.

9. A shape memory actuator for positioning a control member, said actuator comprising:
a first shape memory means for moving the control member in one direction;
a second shape memory means for moving the control member in the other direction;
said first means including an electrically conductive shape memory element having predetermined upper and lower phase transition temperature, said first element assuming a predetermined memory shape when electrically heated to said upper transition temperature, said second means including an electrically conductive shape memory element having predetermined upper and lower phase transition temperatures said second element assuming a predetermined memory shape when electrically heated to said upper transition temperature; and
means for electrically energizing one or the other of said elements to its upper phase transition temperature, said elements being connected to the control member so that the energized element in assuming its memory shape pulls the other element out of its memory shape whereby the control member will be moved in said one or said other direction and said other element is mechanically transformed to its lower temperature phase.

10. The actuator according to claim 9 including means for holding the control member in a fixed position when the heated element is allowed to cool.

11. The actuator according to claim 3 wherein said holding means comprises a first elongate member operatively connected to the control member and to said first and second shape memory elements, a second fixed elongate member positioned in close proximity to said first elongate member and a viscoelastic material positioned between said elongate members to impose a drag on the movement of said first elongate member with respect to the fixed elongate member when the temperature of said first or second shape memory element cools whereby the control member will be held in a fixed position.

12. The actuator according to claim 9 including electrically conductive means connecting one end of said first and second shape memory means to the control member and the other ends to fixed pivot pins.

13. The actuator according to claim 12 wherein said conductive means comprises a thin flat strip having a pair of legs at one end and a curved hook at the other end, said legs being connected to said shape memory elements and said curved hook being connected to the control member and to said pivot pins.

14. A shape memory actuator for controlling the position of a control member, said actuator comprising:
a pair of electrically conductive shape memory elements, one of said elements being connected to move the control member toward an open position and the other of said elements being connected to move the control member toward a closed position,
each of said elements having a shape memory transition temperature above which said elements assume their memory shape, and a lower temperature below which they can be stretched from their memory shape, said elements being connected to the control member so that the electrically energized element pulls the other element from its memory shape to a stretched shape and means for electrically energizing one or the other of said elements to open or close the control member.

15. A shape memory actuator for incrementally positioning a control member, said actuator comprising:
a pair of electrically conductive shape memory elements, the first of said elements being connected to move the control member toward a first position and the second of said elements being connected to move the control member toward a second position; and each of said elements having an austenite phase and a lower temperature phase whereby the stresses in said elements are balanced in any position of the control member and means for electrically energizing one or the other of said elements to position said control member.

* * * * *